(12) United States Patent
Chu

(10) Patent No.: US 6,868,839 B2
(45) Date of Patent: Mar. 22, 2005

(54) VAPORIZED FUEL INJECTION SYSTEM AND METHOD

(76) Inventor: Alex Chu, 225 N. Evergreen Dr., Selden, NY (US) 11784

(*) Notice: Subject to any disclaimer, the term of this patent is extended or adjusted under 35 U.S.C. 154(b) by 5 days.

(21) Appl. No.: 10/410,181

(22) Filed: Apr. 10, 2003

(65) Prior Publication Data

US 2004/0200461 A1 Oct. 14, 2004

(51) Int. Cl.[7] .............................................. F02M 31/00
(52) U.S. Cl. ...................................................... 123/557
(58) Field of Search ................................. 123/543–557

(56) References Cited

U.S. PATENT DOCUMENTS

| | | | | |
|---|---|---|---|---|
| 3,898,968 A | * | 8/1975 | Markus ........................ | 123/445 |
| 4,398,523 A | * | 8/1983 | Henson ........................ | 123/557 |
| 4,494,516 A | * | 1/1985 | Covey, Jr. .................... | 123/557 |
| 4,611,567 A | * | 9/1986 | Covey, Jr. .................... | 123/545 |
| 4,742,801 A | * | 5/1988 | Kelgard ..................... | 123/27 GE |
| 4,883,616 A | * | 11/1989 | Covey, Jr. .................... | 261/64.4 |
| 5,291,870 A | * | 3/1994 | Covey, Jr. .................... | 123/545 |
| 6,550,532 B1 | | 4/2003 | Nakamura et al. | |
| 6,626,162 B2 | * | 9/2003 | Shelor et al. ................ | 123/541 |

* cited by examiner

Primary Examiner—Marguerite McMahon
(74) Attorney, Agent, or Firm—Arent Fox PLLC

(57) ABSTRACT

A vaporized fuel injection system for a combustion engine that includes a fuel vaporization chamber and a two-way valve. The fuel vaporization chamber has a chamber input and a chamber output, and is connected with a fuel source via the chamber input. The fuel vaporization chamber is for vaporizing fuel input to the chamber input and outputting vaporized fuel to the chamber output. The two-way valve has first and second valve inputs and an valve output. The first valve input is connected to the chamber output, and the second valve input is connected to the fuel source. The two-way valve is switchable to allow fuel to flow from only one of the first or second valve inputs to the valve output.

38 Claims, 4 Drawing Sheets

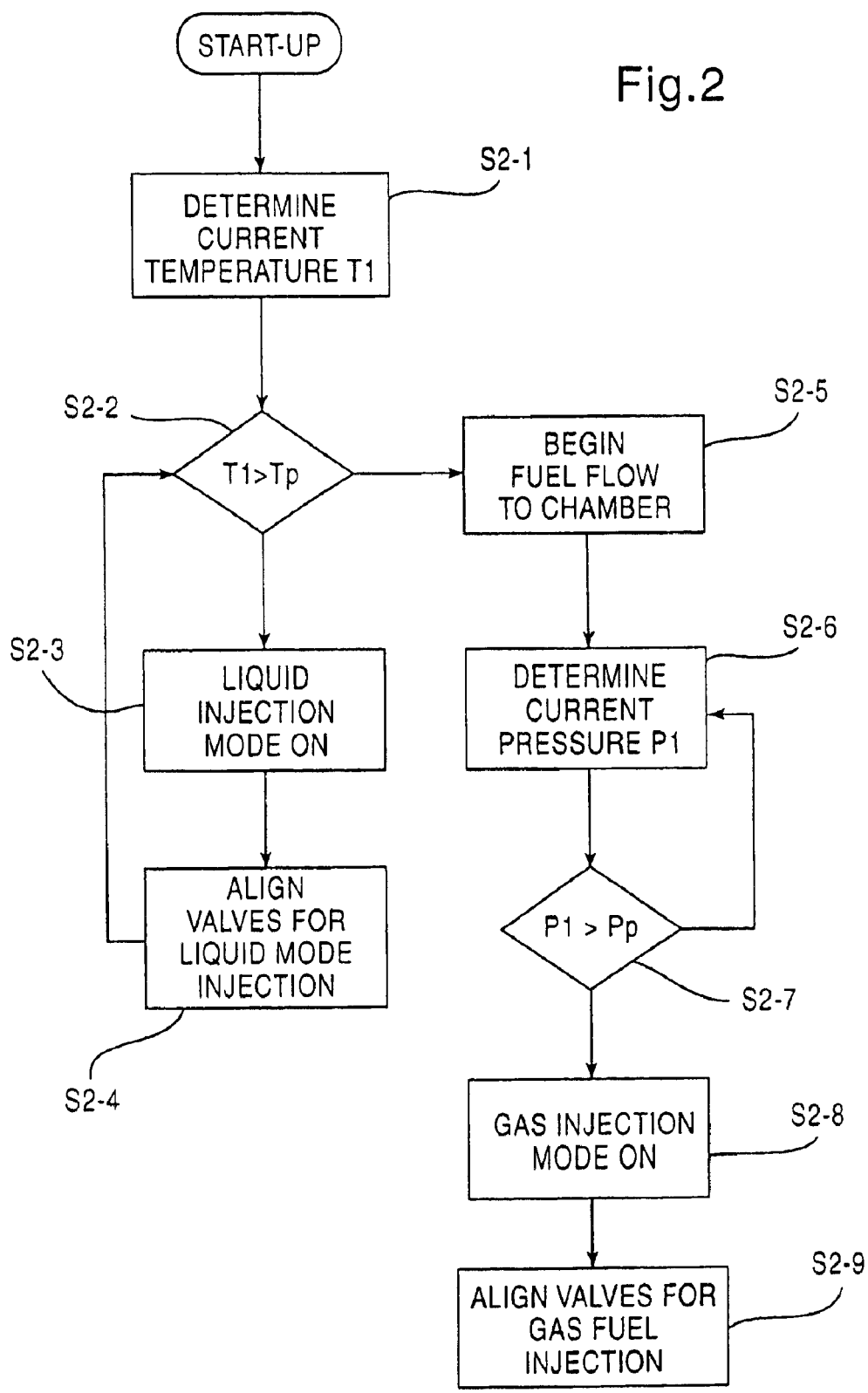

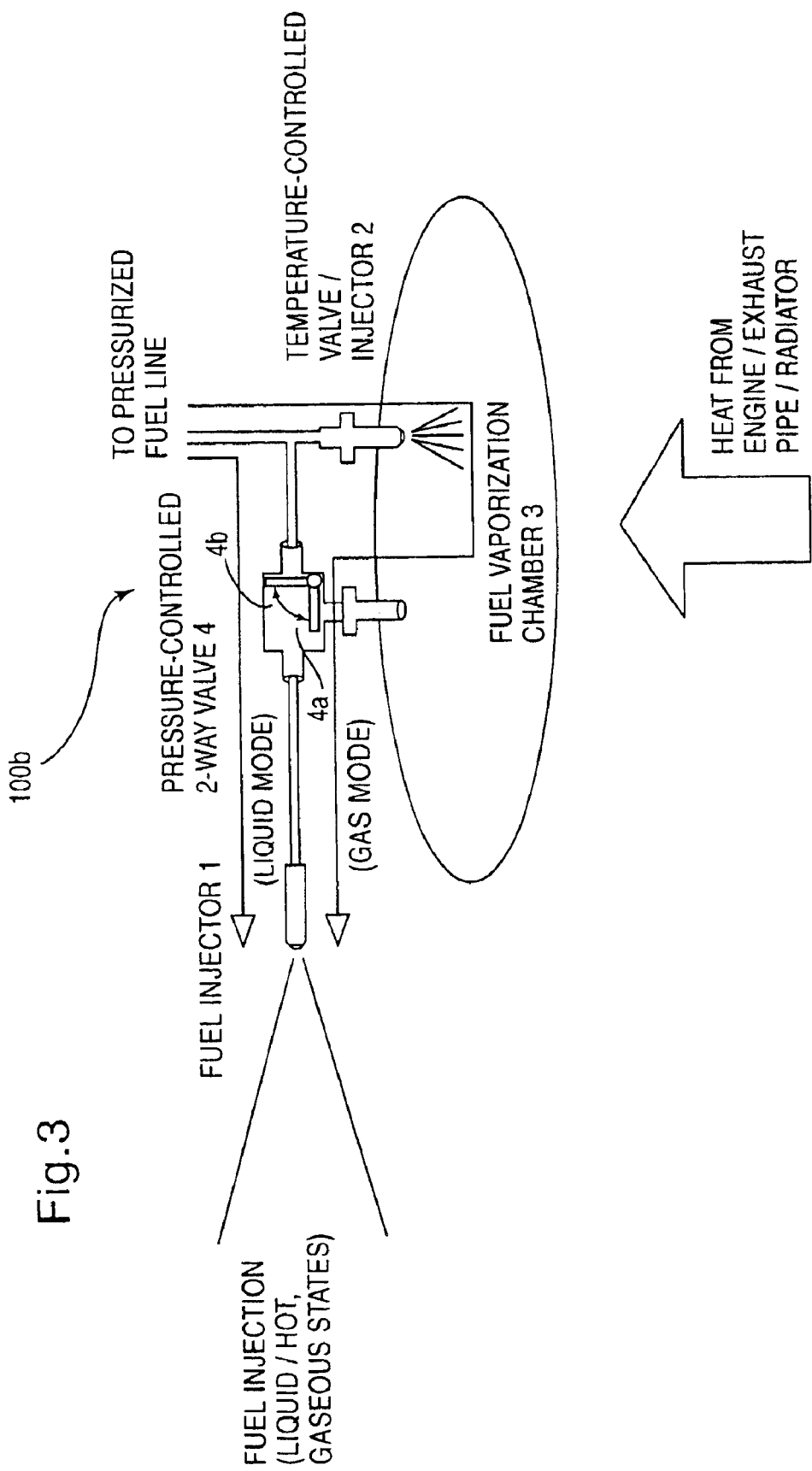

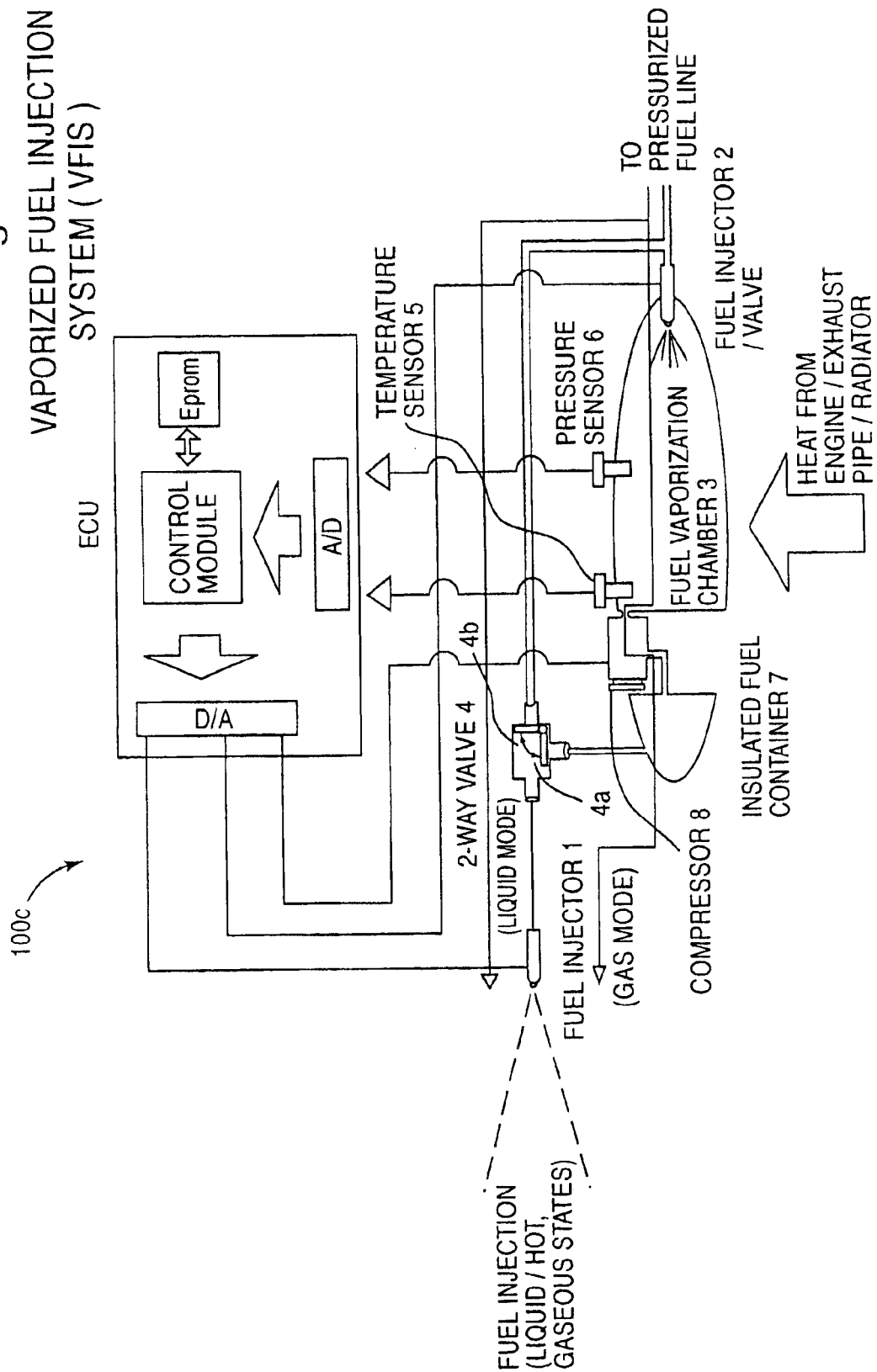

VAPORIZED FUEL INJECTION SYSTEM AND METHOD

BACKGROUND OF THE INVENTION

1. Field of the Invention

This invention relates to fuel delivery systems and methods. More particularly, this invention relates to systems and methods for vaporizing fuel for delivery in combustion engines.

2. Description of the Related Art

Fuel injection systems are commonly used to deliver fuel in many modern engines because of a number of well-known advantages, such as their ability to efficiently and accurately meter fuel flow and the mixture of fuel and air (air/fuel ratio) delivered to an engine. Fuel injection systems can dramatically improve engine performance while reducing engine exhaust gas emissions.

Vaporized or heated fuel delivery systems are also known for improving the efficiency of combustion engines. Once such system is described in U.S. Pat. No. 6,415,775 B1. This patent describes a vaporized fuel delivery system for combustion engines that requires a bubbler fuel tank in order to produce a source of vaporized fuel. The fuel is pulled into the intake port of the combustion source by vacuum.

However, the prior art system is designed for engine with a carburetor fuel supply system. The fuel processor of the prior art system thus has a number of disadvantages. First, it cannot effectively heat the fuel vapor to increase its internal energy for fuel economy and reduced emission. Second, the system cannot heat the fuel vapor to exert high pressure for fuel injection purposes. Third, the system cannot efficiently produce enough preheated, pressurized fuel vapor swiftly for fuel injection.

Thus, there is a need for new and improved vaporized fuel delivery systems that address and solve the problems associated with prior art systems.

SUMMARY OF THE INVENTION

According to an embodiment of the present invention, a vaporized fuel injection system for a combustion engine is provided. The system includes a fuel vaporization chamber and a two-way valve. The fuel vaporization chamber has a first input and a first output, and is connected with a fuel source via the first input. The fuel vaporization chamber vaporizes fuel input to the first input and outputs vaporized fuel to the first output. The two-way valve has first and second valve inputs and an valve output. The first valve input is connected to the first output of the fuel vaporization chamber, and the second valve input is connected to the fuel source. The two-way valve is switchable to allow fuel to flow from only one of the first or second valve inputs to the valve output.

According to another embodiment of the present invention, a vaporized fuel injection system is provided. The system includes a fuel vaporization chamber means for storing fuel to be heated, a first flow-controlling means for controlling fuel flowing into the chamber, a second flow-controlling means for controlling heated-up gaseous fuel flowing out of the chamber, and a heating means for heating up fuel in the chamber. The fuel in the fuel vaporization chamber means is heated up to a gaseous state and is fed to a combustion engine combustion chamber under control of the first and second flow-controlling means.

According to another embodiment of the present invention, a method for heating up fuel to high-temperature, high-pressure gaseous state for injection into a combustion engine is provided. The combustion engine includes a combustion chamber, a fuel source and a vaporization chamber. The method comprises a step of heating said vaporization chamber. When a temperature of the vaporization chamber reaches a predetermined temperature value, fuel is allowed to flow into the vaporization chamber from the fuel source. When a pressure of the vaporization chamber reaches a predetermined pressure value, the fuel is allowed to flow from the vaporization chamber to the combustion chamber.

BRIEF DESCRIPTION OF THE DRAWINGS

The objects and features of the invention will be more readily understood with reference to the following description and the attached drawings, wherein:

FIG. 2 is a flowchart of a method for providing vaporized fuel injection system for a combustion engine, according to an embodiment of the present invention;

FIG. 3 is a block diagram of a mechanically controlled vaporized fuel injection system for a combustion engine, according to another embodiment of the present invention; and FIG. 4 is a block diagram of a vaporized fuel injection system for a combustion engine that utilizes a compressor, according to another embodiment of the present invention.

DETAILED DESCRIPTION OF THE EXEMPLARY EMBODIMENTS

Figure 1:
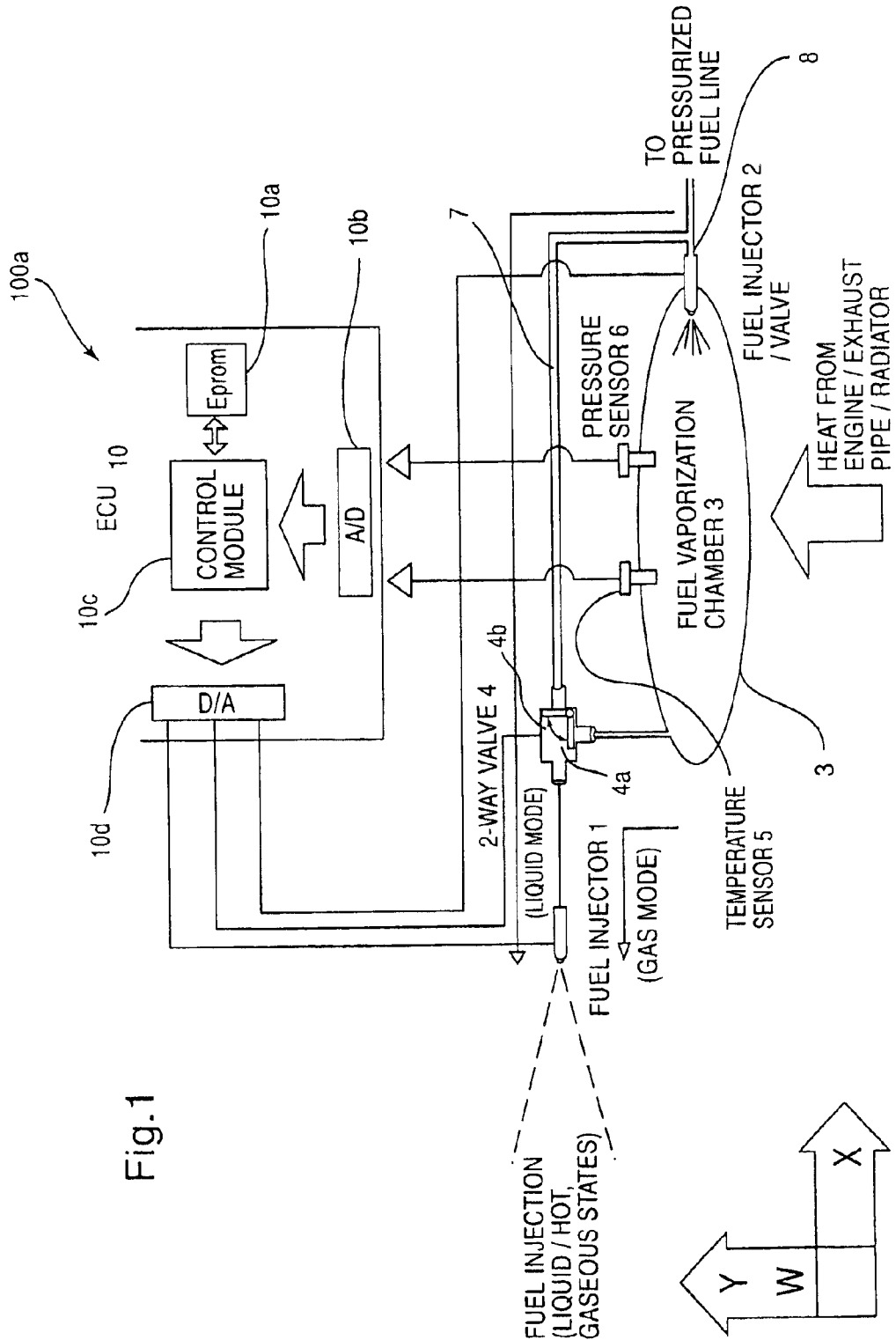
FIG. 1 is a block diagram of an electronic controlled vaporized fuel injection system for a combustion engine, according to an embodiment of the present invention.

FIG. 1 is a block diagram of a fuel injection system according to an embodiment of the present invention. Fuel injection system 100a is configured to operate with a combustion engine, such as a gasoline combustion engine. Fuel injection system 100a includes a fuel vaporization chamber 3 connected to a fuel source, i.e., fuel pump (not shown) via a pressurized fuel line at an inlet (chamber input) via fuel injector valve 2. The fuel vaporization chamber 3 is also connected to a two-way valve 4 at an outlet (chamber outputs) thereof. The two-way valve 4 may be for example, a Y-valve, and includes two inlets (value inputs) and one outlet (valve output), and limits the flow from one of the inlets to the outlet.

The pressurized fuel line branches upstream of the fuel injector valve 2 into a liquid mode branch 7, which connects to the second input of two-way valve 4. The outlet of two-way valve 4 is connected to a fuel injector 1 of the combustion engine. Accordingly, pressurized fuel can be fed to the two-way valve 4 via fuel vaporization chamber 3 or directly via the liquid mode branch 7. The two-way valve 4 is switchable to limit the flow to the fuel injector 1 from either the fuel vaporization chamber 3 or directly from the liquid mode branch 7.

One will readily understand that the above system can be modified for a variety of configurations, and the embodiments described herein are not meant to limit the invention. For example, the vaporized fuel injection system may be duplicated for each fuel injector jet in a combustion engine, or configured to use one or more common vaporization chambers for all fuel injector jets.

Fuel vaporization chamber 3 may be a pressure controlled chamber and configured to heat/vaporize fuels, such as gasoline or propane. Heat may be supplied to the fuel vaporization chamber 3 from a variety of heat sources, such as the engine block, a radiator, exhaust piping, other heat exchangers, etc. Fuel injector valve 2 may be a conventional valve, or a fuel injector having means of spraying fuel into the chamber for more complete fuel vaporization and heating.

An electronic control unit (ECU) 10 is configured to communicate with and control various subsystems of the engine, including the fuel delivery system. Accordingly, ECU 10 includes subcomponents such as a memory unit or EPROM 10a for storing system set-points and configuration data, an analog to digital A/D converter 10b, a processor or control module 10c, and a digital to analog D/A converter 10d. ECU 10 may be coupled with and configured to receive data from a temperature sensor 5 and a pressure sensor 6, which respectively measure temperature and pressure of the vaporization chamber 3. Accordingly, temperature sensor 5 and a pressure sensor 6 may be disposed appropriately within the system to perform such measurements.

ECU 10 is coupled with and configured to control two-way valve 4, fuel injector valve 2, and fuel injector 1, in order to align fuel flow paths of system 100a. One having ordinary skill in the art will readily understand that the constitution of ECU 10 may vary to incorporate modern computing architecture.

Operational details of system 100a are described next with additional reference to the flowchart in FIG. 2. After the engine is started, the current temperature T1 inside the vaporized fuel chamber 3 is determined at step S2-1, via temperature sensor 5. When the temperature T1 of fuel vaporization chamber 3 is below a predetermined value Tp (e.g., low at engine start-up), the system is set to liquid-mode fuel injection mode, at step S2-3. In this mode, ECU 10 performs a valve alignment to establish the liquid mode flow path, at step S2-4. Accordingly, passage from the fuel vaporization chamber 3 to fuel injector 1 is shut off, and two-way valve 4 is aligned so that liquid fuel from the liquid branch 7 is fed to fuel injector 1. Fuel injector/valve 2 is controlled to be inactive at this moment, and no fuel is injected into the fuel vaporization chamber 3 for vaporization. Liquid mode may be the default system alignment at start-up, and therefore, the alignment may have already been performed and steps S2-3 and S2-4 would be skipped. Processing then returns to step S2-1 to monitor the temperature and is repeated.

After the fuel vaporization chamber 3 is heated up to a predetermined temperature Tp (i.e., adequate to vaporize the fuel), it will be determined that T1 is greater than Tp at step S3-2 and processing will proceed to step S2-5.

At step S2-5, ECU 10 turns on the fuel injector/valve 2, and fuel is injected to the vaporization chamber 3. This continues in liquid fuel mode until the pressure P1 in the chamber 3 is high enough due to vapor pressure of fuel. At step S2-6, the pressure is measured within the chamber 3 (i.e., by polling pressure sensor 6). If the measured pressure P1 is greater than a predetermined pressure Pp, then it is determined that the system is ready for vaporized fuel injection. Then, at step S2-8, ECU 10 enters gas-mode fuel injection and performs a valve alignment to switch to the gas mode flow path, at step S2-9. ECU 10 opens the passage from the vaporization fuel chamber 3 to the fuel injector 1 by switching two-way valve 4, allowing vaporized fuel (gasoline in vapor) to be injected into the engine for combustion, and prohibiting liquid fuel from entering the fuel injector 1.

One having ordinary skill will readily understand that fuels like propane are already in gaseous form, and the above method may also be used to heat up the fuel to hot, gaseous form for better combustion to increase fuel economy. Tp and Pp may be set appropriately depending on the fuel type, fuel grade, engine requirements, etc.

According to a second embodiment of the present invention, a mechanically controlled vaporized fuel delivery system in shown in FIG. 3. In this embodiment, System 100b includes the same basic components as 100a, and the same method steps are performed as shown in FIG. 2, except that no ECU is necessary to control the switching from liquid mode to gas mode because mechanically driven valves are used (e.g., pressure relief valves, etc.). Accordingly, two-way valve 4 is pressure controlled and fuel injector/valve 2 is temperature controlled.

When pressure of fuel vaporization chamber 3 is low (P1<Pp), passage from the fuel vaporization chamber 3 to fuel injector 1 via pressure-controlled two-way valve 4 is shut off at position 4a of the valve, and normal mode (liquid mode) fuel injection is active. Pp is the trigger pressure for opening or switching pressure-controlled two-way valve 4. Assuming that the temperature T1 in chamber 3 is below a predetermined temperature Tp, temperature-controlled fuel injector/valve 2 is not active at this moment, and no fuel is injected into the fuel vaporization chamber 3 for vaporization.

After engine start-up, fuel vaporization chamber 3 is heated up from the heating source, and the temperature T1 of fuel vaporization chamber 3 increases. When temperature is high enough and reaches a predetermined temperature Tp, the temperature-controlled valve/injector 2 is turned on, which allows fuel to be injected into the vaporization chamber 3. Tp is the trip/set temperature of the temperature-controlled valve/injector 2.

Fuel vapor pressure in the chamber 3 will increase as fuel is injected into the chamber and heated. When the pressure of the fuel vaporization chamber P1 reaches or exceeds the predetermined level Pp (i.e., high enough for vapor mode), the pressure-controlled two-way valve 4 switches to position 4b and opens the passage from the fuel vaporization chamber 3 to the fuel injector 1. Thus, high-temperature, high-pressure vaporized fuel (gasoline) is injected into the engine for combustion.

One having ordinary skill in the art will readily understand how to implement temperature and pressure driven control valves. It will be understood that Tp and Pp may be set based on the fuel type, fuel grade, engine type, etc. It will also be understood that the size and number of vaporization chambers may be varied as desired. Preferably, the temperature, Tp, is set as high as possible and is close to, but lower than, the valve opening temperature of the engine thermostat. In this way, engine heat will be used to heat up fuel before the radiator fan is turned on and heat is dissipated, unless, of course, a separate heater than the engine block is used to heat the fuel.

A compressor can be added downstream of the vaporization chamber to compress the vaporized fuel prior to injection, as shown in FIG. 4. The system 100c of FIG. 4 is identical to that shown in FIG. 1, except that fuel in fuel vaporization chamber 3 is output to a compressor connected to an insulated fuel chamber 7, which is connect to the two-way valve 4. The two-way valve 4 may have a pressure regulator built-in.

Similar to the embodiments above, after the fuel vaporization chamber 3 is heated up from heating sources like engine block, radiator, exhaust and etc., and the temperature of said chamber 3 reaches the minimum temperature Tp required, liquid-mode injection is entered and fuel flows into fuel vaporization chamber 3. However, when minimum pressure Pp is established in the fuel vaporization chamber 3 and ECU 10 enters gas-mode fuel injection, the compressor 8 is actuated to draw and compress fuel vapor from the chamber 3 into insulated fuel chamber 7, to a higher pressure. When a desired pressure (second predetermined pressure) for fuel injection is reached in insulated fuel chamber 7, the two-way valve 4 switches to position 1, to allow vaporized fuel (gasoline in vapor) to be injected for combustion.

If necessary, the insulated fuel chamber 7 can be installed with a second pressure sensor (not shown) to send a pressure signal to ECU 10 for deactivating compressor 8 based on the pressure in the insulated fuel chamber 7, (i.e., when a maximum pressure is met in the insulated fuel chamber 7) and also for switching position of the two-way valve 4.

Thus, the present invention has been fully described with reference to the drawing figures. Although the invention has been described based upon these preferred embodiments, it would be apparent to those of skilled in the art that certain modifications, variations, and alternative constructions would be apparent, while remaining within the spirit and scope of the invention.

For example, when the system enters the vaporized fuel mode, air/fuel mixture changes and oxygen control system may be configured to change correspondingly to achieve the best performance. However, this can also be done without having oxygen control system to react correspondingly when entering vaporized fuel mode by increasing or decreasing the injection time to control the exact amount of fuel being injected to the combustion chamber via ECU.

I claim:

1. A vaporized fuel injection system for a combustion engine, said system comprising:
   a fuel vaporization chamber having a first input and a first output, and connected with a fuel source via said first input, said fuel vaporization chamber vaporizing fuel input to said first input and outputting vaporized fuel to said first output; and
   a two-way valve having first and second valve inputs and an valve output, said first valve input connected to said first output of said fuel vaporization chamber and said second valve input connected to said fuel source, said two-way valve being switchable to allow fuel to flow from only one of the first or second valve inputs to said valve output.

2. The vaporized fuel injection system recited in claim 1, further comprising:
   a heat source which heats said fuel vaporization chamber.

3. The vaporized fuel injection system recited in claim 2, further comprising:
   a fuel injector valve upstream of said first input of said fuel vaporization chamber and connected with said fuel source; and
   a controller coupled with said two-way valve and said fuel injector valve, and configured to switch said two-way valve between the first and second valve inputs and to control said fuel injector valve to open when a current temperature of said fuel vaporization chamber reaches a predetermined temperature value.

4. The vaporized fuel injection system recited in claim 2, wherein said heat source comprises a heat exchanger connected with an exhaust system.

5. The vaporized fuel injection system recited in claim 2, wherein said heat source comprises a heat exchanger connected with a coolant system of said combustion engine.

6. The vaporized fuel injection system recited in claim 2, wherein said heat source comprises a heat exchanger connected with an engine block of said combustion engine.

7. The vaporized fuel injection system recited in claim 2, further comprising
   a fuel injection valve upstream of said first input of said fuel vaporization chamber, said fuel injection valve including a temperature switch which opens said fuel injection valve when a current temperature of said fuel vaporization chamber reaches a predetermined temperature value.

8. The vaporized fuel injection system recited in claim 7, wherein
   said two-way valve includes a pressure switch which switches said two-way valve to allow fuel from said first valve input to flow to said valve output when said current pressure of said fuel vaporization chamber reaches a predetermined pressure value.

9. The vaporized fuel injection system recited in claim 8, further comprising:
   a temperature sensor disposed within said fuel vaporization chamber, coupled with said temperature switch and providing said current temperature of said fuel vaporization chamber to said temperature switch; and
   a pressure sensor disposed within said fuel vaporization chamber, coupled with said pressure switch and providing said current pressure of said fuel vaporization chamber to said pressure switch.

10. The vaporized fuel injection system recited in claim 8, wherein said predetermined pressure value is based upon a characteristic of said combustion engine.

11. The vaporized fuel injection system recited in claim 3, further comprising:
    a compressor coupled with said controller and fluidly connected with said first output of said fuel vaporization chamber and having a compressor output; and
    an insulated chamber fluidly connected with said compressor output and having an insulated chamber output;
    wherein said first valve input to said two-way valve is connected to said insulated chamber output and said controller activates said compressor to draw and compress fuel to said insulated chamber when a current pressure of said fuel vaporization chamber reaches a predetermined pressure value.

12. The vaporized fuel injection system recited in claims 3 or 11, wherein said heat source comprises a heat exchanger connected with an exhaust system.

13. The vaporized fuel injection system recited in claims 3 or 11, wherein said heat source comprises a heat exchanger connected with a coolant system of said combustion engine.

14. The vaporized fuel injection system recited in claims 3 or 11, wherein said heat source comprises a heat exchanger connected with an engine block of said combustion engine.

15. The vaporized fuel injection system recited in claims 3 or 11, wherein said predetermined temperature valve is based upon a type of fuel to be vaporized in said fuel vaporization chamber.

16. The vaporized fuel injection system recited in claims 3 or 11, wherein said combustion engine is started in a start-up mode, in which said two-way valve is switch to allow fuel from said second valve input to flow to said output and said fuel injector valve is closed.

17. The vaporized fuel injection system recited in claims 3 or 11, wherein said combustion engine is a gasoline engine and said first output of said fuel vaporization chamber is connected to a fuel injector for a cylinder of said combustion engine.

18. The vaporized fuel injection system recited in claim 3, wherein said controller switches said two-way valve to allow fuel to flow from said first valve input to said valve output when a current pressure of said fuel vaporization chamber reaches a predetermined pressure value.

19. The vaporized fuel injection system recited in claim 11, wherein said controller switches said two-way valve to allow fuel to flow from said first valve input to said valve output when a current pressure of said insulated chamber reaches a second predetermined pressure value.

20. The vaporized fuel injection system recited in claims 18 or 19, wherein said controller comprises
   a computer processor;
   a memory unit;
   an input device; and
   an output device,
   wherein said memory unit stores the predetermined temperature and pressure values.

21. The vaporized fuel injection system recited in claims 18 or 19, wherein said predetermined pressure value is based upon a characteristic of said combustion engine.

22. The vaporized fuel injection system recited in claim 18 or 19, wherein said predetermined temperature value is based upon a type of fuel to be vaporized in said fuel vaporization chamber.

23. The vaporized fuel injection system recited in claim 18, further comprising:
   a temperature sensor disposed within said fuel vaporization chamber, coupled with said controller and providing said current temperature of said fuel vaporization chamber to said controller; and
   a pressure sensor disposed within said fuel vaporization chamber, coupled with said controller and providing said current pressure of said fuel vaporization chamber to said controller.

24. The vaporized fuel injection system recited in claim 19, further comprising:
   a temperature sensor disposed within said fuel vaporization chamber, coupled with said controller and providing said current temperature of said fuel vaporization chamber to said controller;
   a first pressure sensor disposed within said fuel vaporization chamber, coupled with said controller and providing said current pressure of said fuel vaporization chamber to said controller; and
   a second pressure sensor disposed within said insulated chamber, coupled with said controller and providing said current pressure of said insulated chamber to said controller.

25. The vaporized fuel injection system recited in claim 18, wherein said predetermined temperature value is set based upon a type of fuel to be vaporized in said fuel vaporization chamber.

26. The vaporized fuel injection system recited in claim 19, wherein said predetermined temperature value is set based upon a type of fuel to be vaporized in said fuel vaporization chamber.

27. The vaporized fuel injection system recited in claim 19, wherein said controller deactivates said compressor when the current pressure of said insulated chamber reaches a maximum insulated chamber pressure value.

28. A method for heating up fuel to high-temperature, high-pressure gaseous state for injection into a combustion engine, the combustion engine including a combustion chamber, a fuel source and a vaporization chamber, said method comprising steps of:
   heating said vaporization chamber; when a temperature of said vaporization chamber reaches a predetermined temperature value, allowing fuel to flow into said vaporization chamber from said fuel source; and
   when a pressure of said vaporization chamber reaches a predetermined pressure value, allowing fuel to flow from said vaporization chamber to said combustion chamber.

29. The method as recited in claim 28, further comprising a step of:
   initially prohibiting fuel to flow into said vaporization chamber and allowing fuel to flow directly from said fuel source to said combustion chamber.

30. The method as recited in claim 28, wherein said step allowing fuel to flow into said vaporization chamber includes a step of measuring a current temperature of said vaporization chamber and comparing said current temperature to said predetermined temperature value, and allowing fuel to flow into said vaporization chamber when said current temperature meets or exceeds said predetermined temperature value.

31. The method as recited in claim 28, wherein said step of allowing fuel to flow from said vaporization chamber to said combustion chamber includes a step of checking a current pressure of said vaporization chamber and comparing said current pressure to said predetermined pressure value, and allowing fuel to flow from said vaporization chamber to said combustion chamber when said current pressure meets or exceeds said predetermined pressure value.

32. The method as recited in claim 28, wherein said step allowing fuel to flow from said vaporization chamber to said combustion chamber includes steps of:
   checking a current pressure of said vaporization chamber and comparing said current pressure to said predetermined pressure value;
   drawing and compressing fuel from said vaporization chamber when said current pressure meets or exceeds said predetermined temperature value; and
   allowing compressed fuel to flow to said combustion chamber when a pressure of said compressed fuel meets or exceeds a second predetermined value.

33. The method as recited in claim 31, wherein said engine includes a temperature sensor and a pressure sensor disposed in said vaporization chamber and coupled with an electronic control unit (ECU) that includes a processor and memory and is configured to control path of fuel in the combustion engine, said method further comprising steps of:
storing said predetermined temperature and pressure values in a memory of said ECU; wherein said ECU receives the current temperature and pressure from the temperature sensor and the pressure sensor respectively, compares said current temperature and current pressure to the stored predetermined temperature and pressure values, respectively.

34. The method as recited in claim 28, wherein said step of allowing fuel to flow into said vaporization chamber includes jet-injecting said fuel into said vaporization chamber.

35. The method of recited in claims 31 or 32, wherein said step of allowing fuel to flow into said vaporization chamber includes jet-injecting said fuel into said vaporization chamber.

36. The method as recited in claim 31 or 32, further comprising steps of:
   when said current temperature of said vaporization chamber is below said predetermined temperature value, prohibiting fuel from flowing into said vaporization chamber from said fuel source; and when said current pressure of said vaporization chamber is below said predetermined pressure value, allowing fuel to flow directly from said fuel source to said combustion chamber and prohibiting fuel to flow from said vaporization chamber to said combustion chamber.

37. A vaporized fuel injection system comprising:

a fuel vaporization chamber means for storing fuel to be heated;

a first flow-controlling means for controlling fuel flowing into said chamber;

a second flow-controlling means for controlling heated-up gaseous fuel flowing out of said chamber; and a heating means for heating up fuel in said chamber;

wherein fuel in said fuel vaporization chamber means is heated up to a gaseous state and is fed to a combustion engine combustion chamber under control of said first and second flow-controlling means;

wherein said first flow-controlling means controls fuel to flow into said fuel vaporization chamber means when a current temperature of said fuel vaporization chamber means meets or exceeds a predetermined temperature; and wherein said second flow-controlling means controls heated-up gaseous fuel flowing out of said fuel vaporization chamber means when current pressure of said fuel vaporization chamber means meets or exceeds a predetermined pressure.

38. The vaporized fuel injection system as recited in claim 37, further comprising a compressor means for compressing fuel flowing out of said fuel vaporization chamber means for injection into a combustion chamber.

* * * * *